(12) United States Patent
Henderickx

(10) Patent No.: US 12,522,039 B2
(45) Date of Patent: Jan. 13, 2026

(54) SUSPENSION SYSTEM WITH PROPORTIONAL PRESSURE ACCUMULATOR

(71) Applicant: Advanced Suspension Technology LLC, Northville, MI (US)

(72) Inventor: Jonas Henderickx, Hasselt (BE)

(73) Assignee: Advanced Suspension Technology LLC, Northville, MI (US)

( * ) Notice: Subject to any disclaimer, the term of this patent is extended or adjusted under 35 U.S.C. 154(b) by 399 days.

(21) Appl. No.: 18/187,799

(22) Filed: Mar. 22, 2023

(65) Prior Publication Data

US 2024/0317007 A1 Sep. 26, 2024

(51) Int. Cl.
  *B60G 17/016* (2006.01)
  *B60G 17/015* (2006.01)
  *B60G 17/08* (2006.01)

(52) U.S. Cl.
  CPC ....... *B60G 17/016* (2013.01); *B60G 17/0152* (2013.01); *B60G 17/08* (2013.01); *B60G 2202/24* (2013.01); *B60G 2204/62* (2013.01); *B60G 2206/41* (2013.01); *B60G 2500/104* (2013.01); *B60G 2600/182* (2013.01); *B60G 2600/26* (2013.01); *B60G 2800/162* (2013.01)

(58) Field of Classification Search
  CPC .. B60G 17/016; B60G 17/0152; B60G 17/08; B60G 2202/24; B60G 2204/62; B60G 2206/41; B60G 2500/104; B60G 2600/26; B60G 2600/182; B60G 2800/162

USPC ............... 280/5.504, 5.506, 5.507, 124.161; 138/30, 31
  See application file for complete search history.

(56) References Cited

U.S. PATENT DOCUMENTS 4,995,485 A * 2/1991 Nakamura ........... F16J 15/3208
                                                              277/411
5,794,966 A * 8/1998 MacLeod ............. B60G 21/073
                                                              280/5.507

(Continued)

FOREIGN PATENT DOCUMENTS

CN      101476571 B     1/2011
CN      111577676 B     2/2022

(Continued)

*Primary Examiner* — Christopher P Schwartz
(74) *Attorney, Agent, or Firm* — Harness, Dickey & Pierce, P.L.C.

(57) ABSTRACT

A suspension system comprises first and second dampers including first and second compression and rebound chambers. A first hydraulic circuit includes a first hydraulic line fluidly connecting the first rebound chamber of the first damper and the second compression chamber of the second damper. A second hydraulic circuit includes a second hydraulic line fluidly connecting the first compression chamber of the first damper and the second rebound chamber of the second damper. A proportional pressure accumulator in fluid communication with at least one of the first and second hydraulic circuits includes an accumulation chamber, a pressurized gas chamber and a volume varying mechanism. The volume varying mechanism selectively varying a volume of the pressurized gas chamber to vary a pressure within the pressurized gas chamber and change a fluid pressure within at least one of the first and second hydraulic circuits.

20 Claims, 4 Drawing Sheets

(56) References Cited

U.S. PATENT DOCUMENTS

| | | | | |
|---|---|---|---|---|
| 6,270,098 | B1 * | 8/2001 | Heyring | B60G 17/033 |
| | | | | 280/6.155 |
| 6,644,354 | B2 * | 11/2003 | Dinkel | F15B 1/24 |
| | | | | 138/30 |
| 6,848,755 | B2 * | 2/2005 | Yuda | F16L 55/053 |
| | | | | 138/30 |
| 6,892,765 | B2 * | 5/2005 | Kamimura | F15B 1/22 |
| | | | | 138/30 |
| 7,686,309 | B2 * | 3/2010 | Munday | B60G 21/06 |
| | | | | 280/5.506 |
| 8,578,970 | B2 | 11/2013 | Kennedy et al. | |
| 9,303,479 | B2 | 4/2016 | Kotrla et al. | |
| 9,352,743 | B2 | 5/2016 | Davis et al. | |
| 9,541,099 | B2 | 1/2017 | Pekarsky et al. | |
| 10,648,487 | B2 | 5/2020 | Weber | |
| 2003/0178076 | A1 * | 9/2003 | Suzuki | F15B 1/103 |
| | | | | 138/30 |

FOREIGN PATENT DOCUMENTS

| | | | | |
|---|---|---|---|---|
| DE | 102007034315 | A1 * | 7/2009 | B62D 5/062 |
| DE | 202009018583 | U1 | 2/2012 | |
| KR | 20170029994 | A * | 3/2017 | B60G 17/0416 |
| WO | WO-2009111826 | A1 | 9/2009 | |

\* cited by examiner

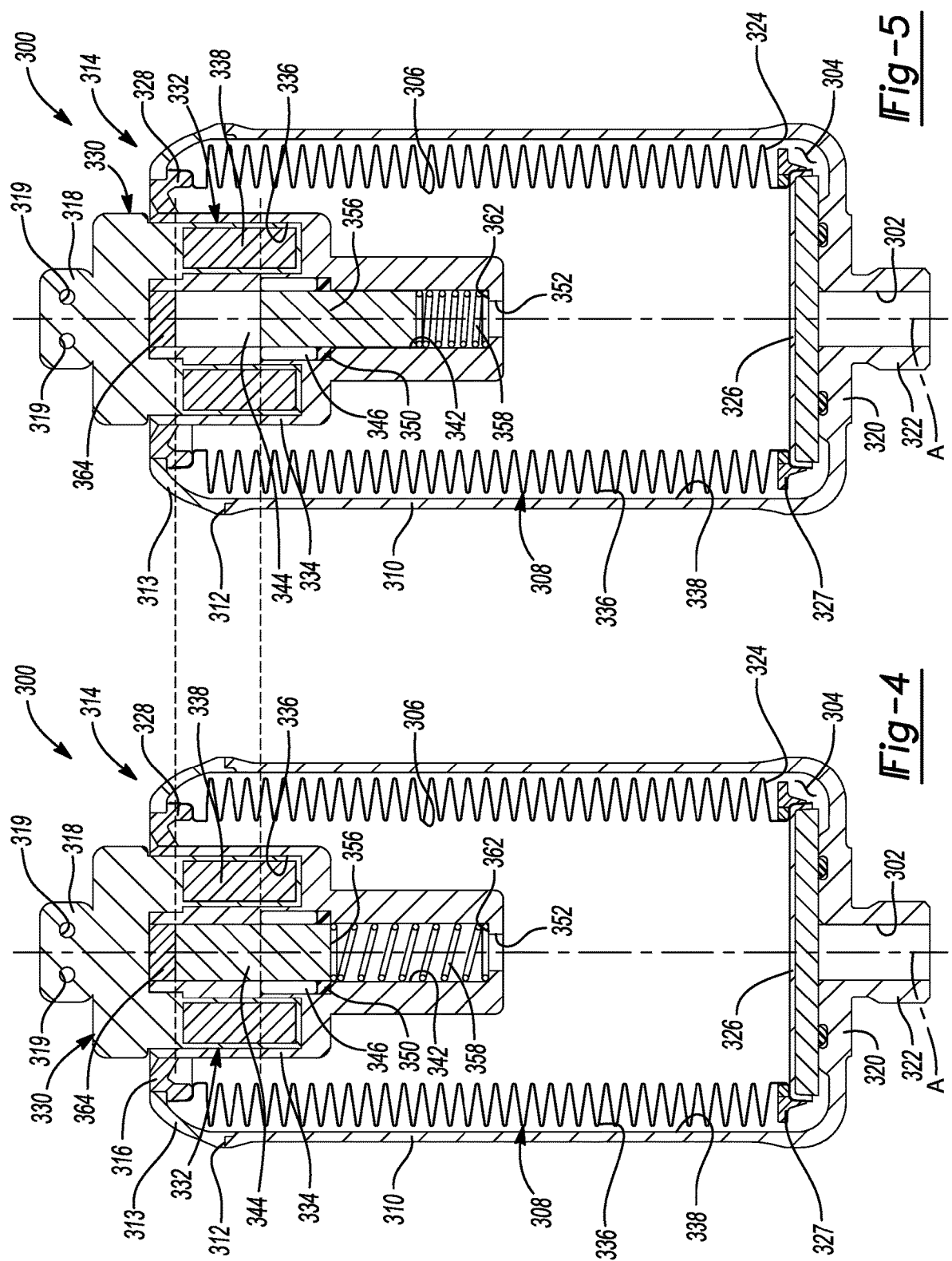

SUSPENSION SYSTEM WITH PROPORTIONAL PRESSURE ACCUMULATOR

FIELD

The present disclosure generally relates to vehicle suspension systems. More particularly, a hydraulic suspension system including a proportional pressure accumulator is discussed.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Most vehicles are equipped with a suspension system operable to absorb loads input to the vehicle during rough road travel, cornering, braking and acceleration. To dissipate the energy associated with the vehicle traveling over bumps and recesses in the road surface, dampers are typically connected between a body and a suspension of the vehicle. The dampers are often equipped with a piston connected to a vehicle body or suspension through a piston rod. The damper also includes a damper housing. The piston rod and an end of the damper housing opposite the piston rod typically include attachment interfaces that connect the damper to the vehicle body and the suspension system. As the damper is compressed or extended, the piston forces damping fluid to flow into and out of fluid chambers on either side of the piston to produce a damping force that counteracts the loads occurring during vehicle operation.

Dampers may also include or be fluidly connected to passive or active electromechanical valves that operate to restrict the flow of damping fluid between the chambers on either side of the piston. The valves may be internally or externally mounted to the damper.

Suspension systems including the aforementioned dampers not only attempt to control reactions to road loads at each wheel end but also attempt to improve the overall handling and safety of the vehicle. In particular, the systems attempt to decrease or otherwise control vehicle roll such as during corning operations and pitch that may occur under deceleration and acceleration of the vehicle. Roll and pitch moments may adversely affect tire adhesion, cornering performance, braking performance and may be uncomfortable to the driver and passengers. Many vehicles are equipped with devices such as stabilizer bars or mechanical linkages that extend laterally across the width of the vehicle to control roll. Several drawbacks exist with the mechanical anti-roll systems. Packaging concerns arise as the stabilizer bar typically requires an unobstructed path across the width of the vehicle. The mass of these devices may also be undesirably high. Furthermore, the mechanical systems may not be easily switched on or off or controlled to account for differing road load conditions and vehicle operating conditions.

Advanced suspension systems have replaced traditional mechanical bars and linkages with fluid control systems hydraulically interconnecting two or more dampers located on the vehicle. A pressure change in one of the chambers of one damper will be transferred across the vehicle to another chamber in a different damper. While these systems may reduce roll, undesirable effects may arise such as the unwanted transmission of bump forces being transmitted from one damper to another damper across the hydraulic circuit resulting in undesirable suspension movement.

Many of the more advanced suspension systems are equipped with at least one fluid pump and several electromechanical valves. While these systems have functioned well, the cost of manufacture, packaging space and overall system complexity may be significant. Accordingly, it may be beneficial to provide a simplified vehicle suspension system.

SUMMARY

A suspension system comprises first and second dampers including first and second compression and rebound chambers. A first hydraulic circuit includes a first hydraulic line fluidly connecting the first rebound chamber of the first damper and the second compression chamber of the second damper. A second hydraulic circuit includes a second hydraulic line fluidly connecting the first compression chamber of the first damper and the second rebound chamber of the second damper. A proportional pressure accumulator in fluid communication with at least one of the first and second hydraulic circuits includes an accumulation chamber, a pressurized gas chamber and a volume varying mechanism. The volume varying mechanism selectively varying a volume of the pressurized gas chamber to vary a pressure within the pressurized gas chamber and change a fluid pressure within at least one of the first and second hydraulic circuits.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 4 is a cross-sectional side view of an exemplary proportional pressure accumulator having a volume varying mechanism in a first state of operation; and FIG. 5 is a cross-sectional side view of the proportional pressure accumulator depicted in FIG. 4 having the volume varying mechanism shown operating in a second mode of operation reducing the volume of a pressurized gas chamber.

In the drawings, reference numbers may be reused to identify similar and/or identical elements.

DETAILED DESCRIPTION

Figure 1:
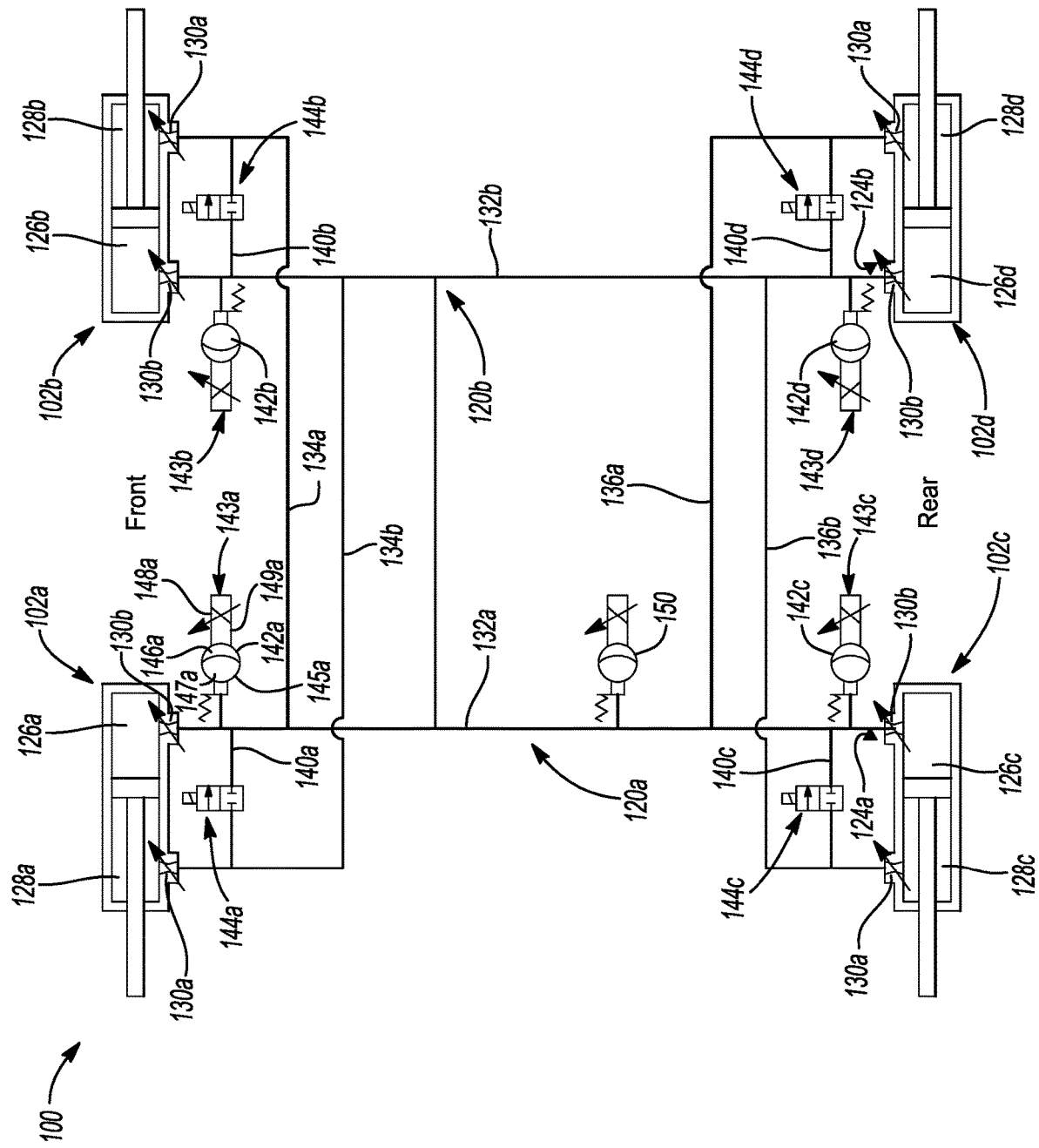
FIG. 1 is a schematic diagram illustrating an exemplary suspension system of the present disclosure including comfort valves and proportional pressure accumulators.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, a suspension system 100 including a front left damper 102a, a front right damper 102b, a back left damper 102c, and a back right damper 102d. While it should be appreciated that the suspension system 100 described herein may include a different number of dampers than those shown in the drawings, in most automotive applications, four dampers are used at each corner of a vehicle to control vertical movements of the front and rear wheels of the vehicle. Thus, the front left damper 102a controls (e.g., dampens) up and down (i.e., vertical) movements of the front left wheel of the vehicle, the front right damper 102b controls (e.g., dampens) up and down (i.e., vertical) movements of the front right wheel of the vehicle, the back left damper 102c controls (e.g., dampens) up and down (i.e., vertical) movements of the back left wheel of the vehicle, and the back right damper 102d controls (e.g., dampens) up and down (i.e., vertical) movements of the back right wheel of the vehicle.

The front and rear dampers 102a, 102b, 102c, 102d are fluidly interconnected by first and second hydraulic circuits 120a, 120b. A first pressure sensor 124a is arranged to monitor the pressure in the first hydraulic circuit 120a and a second pressure sensor 124b is arranged to monitor the pressure in the second hydraulic circuit 120b.

It should be appreciated that fluid pressure in the first and second hydraulic circuits 120a, 120b operates to dynamically adjust the roll stiffness of the vehicle and can be used to either augment or completely replace mechanical stabilizer bars/anti-roll bars. Such mechanical systems require relatively straight, unobstructed runs between each of the front dampers 102a, 102b and each of the back dampers 102c, 102d. Accordingly, the suspension system 100 disclosed herein offers packaging benefits because the dampers 102a, 102b, 102c, 102d only need to be hydraulically connected to one another.

Each of the dampers 102a, 102b, 102c, 102d of the suspension system 100 includes a damper housing, a piston rod, and a piston that is mounted on the piston rod. The piston is arranged in sliding engagement with the inside of the damper housing such that the piston divides the damper housing into compression and rebound chambers. As such, the front left damper 102a includes a first compression chamber 126a and a first rebound chamber 128a, the front right damper 102b includes a second compression chamber 126b and a second rebound chamber 128b, the back left damper 102c includes a third compression chamber 126c and a third rebound chamber 128c, and the back right damper 102d includes a fourth compression chamber 126d and a fourth rebound chamber 128d.

In each damper 102a, 102b, 102c, 102d, the piston is a closed piston with no fluid flow paths defined within or by its structure. In addition, there are no other fluid flow paths in the damper housing such that no fluid is communicated between the compression and rebound chambers of the dampers 102a, 102b, 102c, 102d except through the first and second hydraulic circuits 120a, 120b. The rebound chambers 128a, 128b, 128c, 128d of the dampers 102a, 102b, 102c, 102d decrease in volume during rebound/extension strokes and increase in volume during compression strokes of the dampers 102a, 102b, 102c, 102d. The compression chambers 126a, 126b, 126c, 126d of the dampers 102a, 102b, 102c, 102d decrease in volume during compression strokes of the dampers 102a, 102b, 102c, 102d and increase in volume during rebound/extension strokes of the dampers 102a, 102b, 102c, 102d.

Each damper 102a, 102b, 102c, 102d also includes rebound and compression chamber ports 130a, 130b in the damper housing that are each provided with dampening valves. The rebound chamber port 130a is arranged in fluid communication with the rebound chamber 128a, 128b, 128c, 128d of the damper 102a, 102b, 102c, 102d and the second port 130b is arranged in fluid communication with the compression chamber 126a, 126b, 126c, 126d of the damper 102a, 102b, 102c, 102d. The dampening valves in the rebound and compression chamber ports 130a, 130b can be passive/spring-biased valves (e.g., spring-disc stacks) or active valves (e.g., electromechanical valves) and control fluid flow into and out of the compression and rebound chambers of the dampers 102a, 102b, 102c, 102d to provide one or more rebound dampening rates and compression dampening rates for each of the dampers 102a, 102b, 102c, 102d.

The first hydraulic circuit 120a includes a first longitudinal hydraulic line 132a that extends between and fluidly connects the second port 130b (to the first compression chamber 126a) of the front left damper 102a and the second port 130b (to the third compression chamber 126c) of the back left damper 102c. The first hydraulic circuit 120a includes a front hydraulic line 134a that extends between and fluidly connects the first longitudinal hydraulic line 132a and the rebound chamber port 130a (to the second rebound chamber 128b) of the front right damper 102b. The first hydraulic circuit 120a also includes a rear hydraulic line 136a that extends between and fluidly connects the first longitudinal hydraulic line 132a and the rebound chamber port 130a (to the fourth rebound chamber 128d) of the back right damper 102d. The second hydraulic circuit 120b includes a second longitudinal hydraulic line 132b that extends between and fluidly connects the compression chamber port 130b (to the second compression chamber 126b) of the front right damper 102b and the compression chamber port 130b (to the fourth compression chamber 126d) of the back right damper 102d. The second hydraulic circuit 120b includes a front hydraulic line 134b that extends between and fluidly connects the second longitudinal hydraulic line 132b and the rebound chamber port 130a (to the first rebound chamber 128a) of the front left damper 102a. The second hydraulic circuit 120b also includes a rear hydraulic line 136b that extends between and fluidly connects the second longitudinal hydraulic line 132b and the rebound chamber port 130a (to the third rebound chamber 128c) of the back left damper 102c. It should be appreciated that the word "longitudinal" as used in the first and second longitudinal hydraulic lines 132a, 132b simply means that the first and second longitudinal hydraulic lines 132a, 132b run between the front dampers 102a, 102b and the back dampers 102c, 102d generally. The first and second longitudinal hydraulic lines 132a, 132b need not be linear or arranged in any particular direction as long as they ultimately connect the front dampers 102a, 102b and the back dampers 102c, 102d.

The suspension system 100 also includes four bridge hydraulic lines 140a, 140b, 140c, 140d that fluidly couple the first and second hydraulic circuits 120a, 120b and each corner of the vehicle. The four bridge hydraulic lines 140a, 140b, 140c, 140d include a front left bridge hydraulic line 140a that extends between and fluidly connects the first longitudinal hydraulic line 132a of the first hydraulic circuit 120a and the front hydraulic line 134b of the second hydraulic circuit 120b, a front right bridge hydraulic line 140b that extends between and fluidly connects the front hydraulic line 134a of the first hydraulic circuit 120a and the second longitudinal hydraulic line 132b of the second hydraulic circuit 120b, a back left bridge hydraulic line 140c that extends between and fluidly connects the first longitudinal hydraulic line 132a of the first hydraulic circuit 120a and the rear hydraulic line 136b of the second hydraulic circuit 120b, and a back right bridge hydraulic line 140d that extends between and fluidly connects the rear hydraulic line 136a of the first hydraulic circuit 120a and the second longitudinal hydraulic line 132b of the second hydraulic circuit 120b.

The front left bridge hydraulic line 140a is connected to the first longitudinal hydraulic line 132a between the compression chamber port 130b of the front left damper 102a and the front hydraulic line 134a of the first hydraulic circuit 120a. The front right bridge hydraulic line 140b is connected to the second longitudinal hydraulic line 132b between the compression chamber port 130b of the front right damper 102b and the front hydraulic line 134b of the second hydraulic circuit 120b. The back left bridge hydraulic line 140c is connected to the first longitudinal hydraulic line 132a between the compression chamber port 130b of the back left damper 102c and the rear hydraulic line 136a of the first hydraulic circuit 120a. The back right bridge hydraulic line 140d is connected to the second longitudinal hydraulic line 132b between the compression chamber port 130b of the back right damper 102d and the rear hydraulic line 136b of the second hydraulic circuit 120b. In the illustrated example, the various hydraulic lines are made of flexible tubing (e.g., hydraulic hoses), but it should be appreciated that other conduit structures and/or fluid passageways can be used.

A front left accumulator 142a is arranged in fluid communication with the first longitudinal hydraulic line 132a at a location between the compression chamber port 130b of the front left damper 102a and the front left bridge hydraulic line 140a. A front right accumulator 142b is arranged in fluid communication with the second longitudinal hydraulic line 132b at a location between the compression chamber port 130b of the front right damper 102b and the front right bridge hydraulic line 140b. A back left accumulator 142c is arranged in fluid communication with the first longitudinal hydraulic line 132a at a location between the compression chamber port 130b of the back left damper 102c and the back left bridge hydraulic line 140c. A back right accumulator 142d is arranged in fluid communication with the second longitudinal hydraulic line 132b at a location between the compression chamber port 130b of the back right damper 102d and the back right bridge hydraulic line 140d. Each of the accumulators has a variable fluid volume that increases and decreases depending on the fluid pressure in the first and second longitudinal hydraulic lines 132a, 132b.

It should be appreciated that the accumulators 142a, 142b, 142c, 142d may be constructed in a number of different ways. For example and without limitation, the accumulators 142a, 142b, 142c, 142d may have accumulation chambers and pressurized gas chambers that are separated by floating pistons or flexible membranes, such as a bellows. It is contemplated that each of the accumulators 142a, 142b, 142c, 142d is configured as a proportional pressure accumulator. As will be described in greater detail below, each proportional pressure accumulator 142a, 142b, 142c, 142d includes a volume displacement mechanism 143a, 143b, 143c, 143d operable to vary the volume of the pressurized gas chamber and thereby vary the pressure of the gas stored within the pressurized gas chamber. Such a feature may be useful to selectively increase or decrease the fluid pressure within suspension system 100 at the particular location of the proportional pressure accumulator and thereby vary the magnitude of roll or pitch resistance. By changing the pressure magnitude of the fluid within the suspension system 100, a vehicle operator or occupant will experience change in the "feel" of the vehicle's response to compression and rebound events. A change in system pressure will also change the interval of the response.

The suspension system 100 also includes four electro-mechanical comfort valves 144a, 144b, 144c, 144d that are connected in-line (i.e., in series) with each of the bridge hydraulic lines 140a, 140b, 140c, 140d and each of the longitudinal hydraulic lines 132a, 132b. A front left comfort valve 144a is positioned in the front left bridge hydraulic line 140a. A front right comfort valve 144b is positioned in the front right bridge hydraulic line 140b. A back left comfort valve 144c is positioned in the back left bridge hydraulic line 140c. A back right comfort valve 144d is positioned in the back right bridge hydraulic line 140d. In the illustrated example, the comfort valves 144a, 144b, 144c, 144d are semi-active electro-mechanical valves with a combination of passive spring-disk elements and a solenoid. The comfort valves 144a, 144b, 144c, 144d are electronically connected to a controller (not shown), which is configured to supply electrical current to the solenoids of the comfort valves 144a, 144b, 144c, 144d to selectively and individually open and close the comfort valves 144a, 144b, 144c, 144d. The controller may be configured to act in response to various inputs, including signals from the first and second pressure sensors 124a, 124b.

The first pressure sensor 124a is arranged to output a signal indicative of the fluid pressure in the first longitudinal hydraulic line 132a to the controller and the second pressure sensor 124b is arranged to output a signal indicative of the fluid pressure in the second longitudinal hydraulic line 132b to the controller. When the vehicle is cornering, braking, or accelerating, the lateral and longitudinal acceleration is measured by one or more accelerometers (not shown) and the anti-roll torque to control the roll of the vehicle is calculated by the controller. Alternatively, the lateral and longitudinal acceleration of the vehicle can be computed by the controller based on a variety of different inputs, including without limitation, steering angle, vehicle speed, brake pedal position, and/or accelerator pedal position. The dampers 102a, 102b, 102c, 102d are used to provide forces that counteract the roll moment induced by the lateral acceleration, thus reducing the roll angle of the vehicle.

The first and second hydraulic circuits 120a, 120b operate as a closed loop system, either together or separately depending on the open or closed status of the electro-mechanical comfort valves 144a, 144b, 144c, 144d. As will be explained in greater detail below, the suspension system 100 can control the roll stiffness of the vehicle, which changes the degree to which the vehicle will lean to one side or the other during corning (i.e., roll).

For example, when the vehicle is put into a right-hand turn, the momentum of the sprung weight of the vehicle tends to make the vehicle lean left towards the outside of the turn, compressing the front left damper 102a and the back left damper 102c. When this occurs, fluid flows out from the first compression chamber 126a of the front left damper 102a and the third compression chamber 126c of the back left damper 102c into the first longitudinal hydraulic line 132a of the first hydraulic circuit 120a. As a result of the weight transfer to the left side of the vehicle, the front right damper 102b and back right damper 102d begin to extend, causing fluid to flow out of the second rebound chamber 128b of the front right damper 102b and the fourth compression chamber 126d of the back right damper 102d into the front and rear hydraulic lines 134a, 136a of the first hydraulic circuit 120a. When the comfort valves 144a, 144b, 144c, 144d are closed, the fluid flow out of the first compression chamber 126a of the front left damper 102a, out of the third compression chamber 126c of the back left damper 102c, out of the second rebound chamber 128b of the front right damper 102b, and out of the fourth rebound chamber 128d of the back right damper 102d and into the front and rear hydraulic lines 134a, 136a of the first hydraulic circuit 120a increases the pressure in the front left and back left accumulators 142a, 142c, thus providing a passive roll resistance where it becomes increasingly more difficult to compress the front left damper 102a and the back left damper 102c since the first compression chamber 126a of the front left damper 102a and the third compression chamber 126c of the back left damper 102c are connected in fluid communication with the first hydraulic circuit 120a. At the same time, fluid flows out of front right and back right accumulators 142b, 142d and into the first rebound chamber 128a of the front left damper 102a, into the third rebound chamber 128c of the back left damper 102c, into the second compression chamber 126b of the front right damper 102b, and into the fourth compression chamber 126d of the back right damper 102d. The resulting pressure difference between the dampers 102a, 102b, 102c, 102d generates damper forces that counteract or resist the roll moment of the vehicle.

Active roll resistance can be added by actuating one of proportional pressure accumulators 142a and 142c to increase fluid pressure in the first hydraulic circuit 120a.

The opposite is true when the vehicle is put into a left-hand turn, where the momentum of the sprung weight of the vehicle tends to make the vehicle lean right towards the outside of the turn, compressing the front right damper 102b and the back right damper 102d. When this occurs, fluid flows out from the second compression chamber 126b of the front right damper 102b and the fourth compression chamber 126d of the back right damper 102d into the second longitudinal hydraulic line 132b of the second hydraulic circuit 120b. As a result of the weight transfer to the right side of the vehicle, the front left damper 102a and back left damper 102c begin to extend, causing fluid to flow out of the first rebound chamber 128a of the front left damper 102a and the third rebound chamber 128c of the back left damper 102c into the front and rear hydraulic lines 134b, 136b of the second hydraulic circuit 120b. When the comfort valves 144a, 144b, 144c, 144d are closed, the fluid flow out of the second compression chamber 126b of the front right damper 102b, out of the fourth compression chamber 126d of the back right damper 102d, out of the first rebound chamber 128a of the front left damper 102a, and out of the third rebound chamber 128c of the back left damper 102c and into the front and rear hydraulic lines 134b, 136b of the second hydraulic circuit 120b increases the pressure in the front right and back right accumulators 142b, 142d, thus providing a passive roll resistance where it becomes increasingly more difficult to compress the front right damper 102b and the back right damper 102d since the second compression chamber 126b of the front right damper 102b and the fourth compression chamber 126d of the back right damper 102d are connected in fluid communication with the second hydraulic circuit 120b. At the same time, fluid flows out of front left and back left accumulators 142a, 142c and into the second rebound chamber 128b of the front right damper 102b, into the fourth rebound chamber 128d of the back right damper 102d, into the first compression chamber 126a of the front left damper 102a, and into the third compression chamber 126c of the back left damper 102c. The resulting pressure difference between the dampers 102a, 102b, 102c, 102d generates damper forces that counteract or resist the roll moment of the vehicle. Additional roll resistance may be added by actuating one of proportional pressure accumulators 142b and 142d to increase fluid pressure in the second hydraulic circuit 120b.

When roll stiffness is not required, the comfort valves 144a, 144b, 144c, 144d can be opened to enhance the ride comfort of the suspension system 100 and reduce or eliminate unwanted suspension movements resulting from the hydraulic coupling of one damper of the system to another damper of the system (e.g., where the compression of one damper causes movement and/or a dampening change in another damper). For example, when the front left comfort valve 144a is open and the front left damper 102a undergoes a compression stroke as the front left wheel hits a bump, fluid may flow from the first compression chamber 126a of the front left damper 102a, into the first longitudinal hydraulic line 132a, from the first longitudinal hydraulic line 132a to the front hydraulic line 134b of the second hydraulic circuit 120b by passing through the front left bridge hydraulic line 140a and the front left comfort valve 144a, and into the first rebound chamber 128a of the front left damper 102a. Thus, fluid can travel from the first compression chamber 126a to the first rebound chamber 128a of the front left damper 102a with the only restriction coming from the dampening valves in the rebound and compression chamber ports 130a, 130b of the front left damper 102a. As such, when all of the comfort valves 144a, 144b, 144c, 144d are open, the dampers 102a, 102b, 102c, 102d are effectively decoupled from one another for improved ride comfort.

Suspension system 100 includes another proportional pressure accumulator identified at reference numeral 150. Proportional pressure accumulator 150 may also be considered as a system accumulator operable to account for temperature variations experienced by the suspension system 100. As the operating temperature of the fluid within the suspension system 100 changes, so does the pressure of the fluid within the system. Accumulator 150 is electrically coupled to the controller such that pressure increases or decreases due to the temperature change are compensated by increasing or decreasing the volume of pressurized gas chamber to change the pressure in the suspension system 100.

Figure 2:
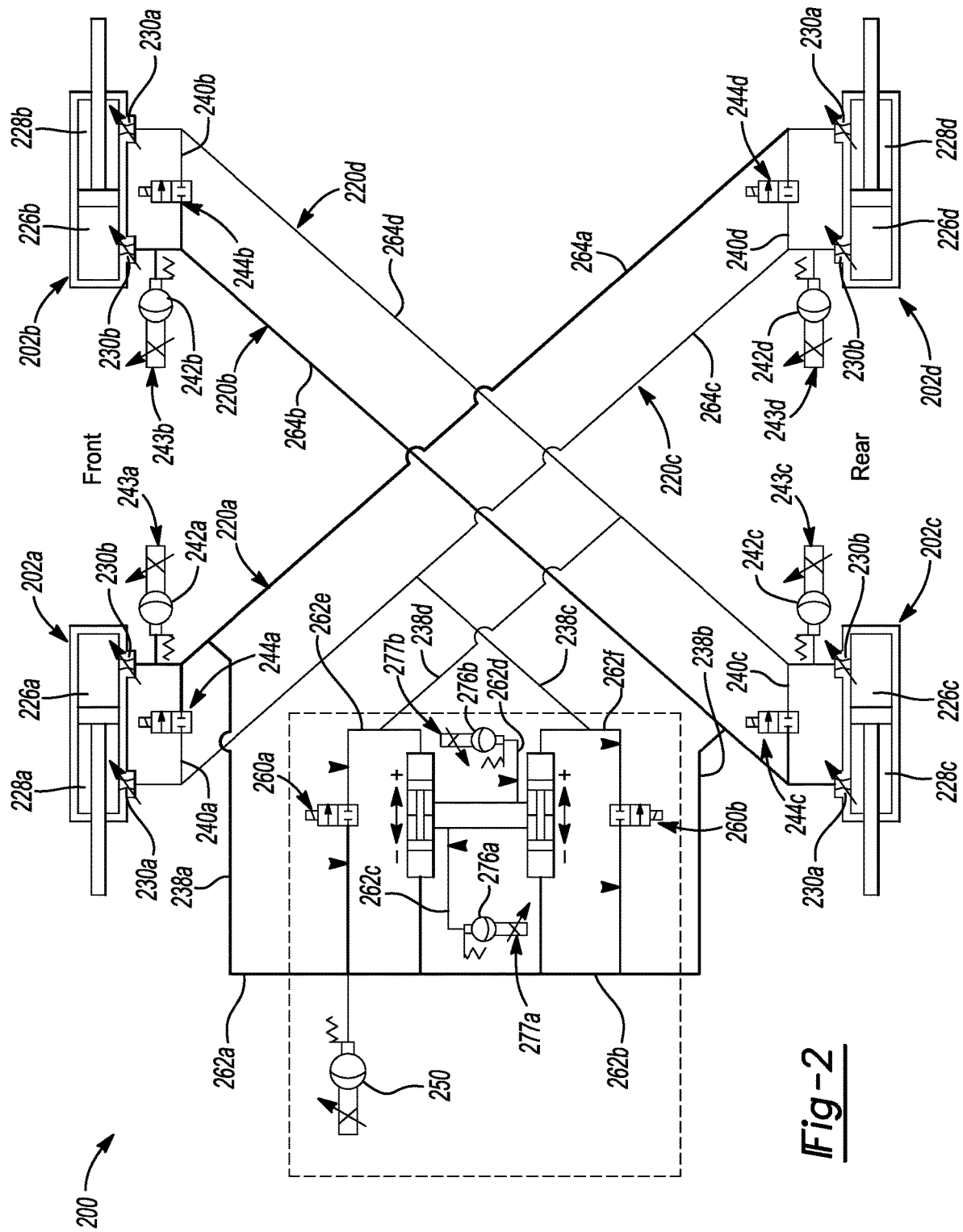
FIG. 2 is a schematic diagram illustrating another exemplary suspension system of the present disclosure including four hydraulic circuits connecting front and rear dampers and proportional pressure accumulators.

With reference to FIG. 2, another suspension system 200 shares many of the same components as the suspension system 100 illustrated in FIG. 1. Rather than repeat the description set forth above, the following paragraphs describe the structure and function of the components in FIG. 2 that are new and/or different from those shown and described in connection with FIG. 1. It should be appreciated that the reference numbers in FIG. 1 are "100" series numbers (e.g., 100, 102, 104, etc.) whereas the components in FIG. 2 that are the same or similar to the components of the suspension system 100 shown in FIG. 1 share the same base reference numbers but are listed as "200" series numbers (e.g., 200, 202, 204, etc.). Thus, the same description for element 100 above applies to element 200 in FIG. 2 and so on and so forth.

The suspension system 200 in FIG. 2 also includes a front left damper 202a, a front right damper 202b, a back left damper 202c, and a back right damper 202d interconnected by four hydraulic circuits 220a, 220b, 220c, 220d: a first hydraulic circuit 220a, a second hydraulic circuit 220b, a third hydraulic circuit 220c, and a fourth hydraulic circuit 220d.

Suspension system 200 also includes a first manifold comfort valve 260a, a second manifold comfort valve 260b, and six manifold conduits 262a, 262b, 262c, 262d, 262e, 262f: a first manifold conduit 262a, a second manifold conduit 262b, a third manifold conduit 262c, a fourth manifold conduit 262d, a fifth manifold conduit 262e, and a sixth manifold conduit 262f. The first manifold conduit 262a is connected in fluid communication with a proportional pressure accumulator 250 and the first manifold comfort valve 260a while the second manifold conduit 262b is connected in fluid communication with the second manifold comfort valve 260b. The third manifold conduit 262c is connected in fluid communication with a first manifold accumulator 276a and the fourth manifold conduit 262d is connected in fluid communication with a second manifold accumulator 276b. The fifth manifold conduit 262e is connected in fluid communication with the first manifold comfort valve 260a and the sixth manifold conduit 262f is connected in fluid communication with the second manifold comfort valve 260b. It should be appreciated from FIG. 2 that fluid pressure in the four hydraulic circuits 220a, 220b, 220c, 220d operates to dynamically adjust the roll and pitch stiffness of the vehicle and can be used to either augment or completely replace mechanical stabilizer bars/anti-roll bars. Such mechanical systems require relatively straight, unobstructed runs between each of the front dampers 202a, 202b and each of the back dampers 202c, 202d. Accordingly, the suspension system 200 disclosed herein offers packaging benefits because the dampers 202a, 202b, 202c, 202d only need to be hydraulically connected to the manifold assembly 204.

The first hydraulic circuit 220a includes a first cross-over hydraulic line 264a that extends between and fluidly connects the compression chamber port 230b (to the first compression chamber 226a) of the front left damper 202a and the rebound chamber port 230a (to the fourth rebound chamber 228d) of the back right damper 202d. The first hydraulic circuit 220a also includes a first manifold hydraulic line 238a that extends between and fluidly connects the first cross-over hydraulic line 264a and a first manifold conduit 262a. The second hydraulic circuit 220b includes a second cross-over hydraulic line 264b that extends between and fluidly connects the compression chamber port 230b (to the second compression chamber 226b) of the front right damper 202b and the rebound chamber port 230a (to the third rebound chamber 228c) of the back left damper 202c. The second hydraulic circuit 220b also includes a second manifold hydraulic line 238b that extends between and fluidly connects the second cross-over hydraulic line 264b and the second manifold conduit 262b. The third hydraulic circuit 220c includes a third cross-over hydraulic line 264c that extends between and fluidly connects the rebound chamber port 230a (to the first rebound chamber 228a) of the front left damper 202a and the compression chamber port 230b (to the fourth compression chamber 226d) of the back right damper 202d. The third hydraulic circuit 220c also includes a third manifold hydraulic line 238c that extends between and fluidly connects the third cross-over hydraulic line 264c and a sixth manifold conduit 262f. The fourth hydraulic circuit 220d includes a fourth cross-over hydraulic line 262d that extends between and fluidly connects the rebound chamber port 230a (to the second rebound chamber 228b) of the front right damper 202b and the compression chamber port 230b (to the third compression chamber 226c) of the back left damper 202c. The fourth hydraulic circuit 220d also includes a fourth manifold hydraulic line 238d that extends between and fluidly connects the fourth cross-over hydraulic line 264d and a fifth manifold conduit 262e. It should be appreciated that the word "cross-over" as used in the first, second, third, and fourth cross-over hydraulic lines 264a, 264b, 264c, 264d simply means that the first, second, third, and fourth cross-over hydraulic lines 264a, 264b, 264c, 264d run between dampers 202a, 202b, 202c, 202d at opposite corners of the vehicle (e.g., front left to back right and front right to back left). The first, second, third, and fourth cross-over hydraulic lines 264a, 264b, 264c, 264d need not be linear or arranged in any particular direction as long as they ultimately connect dampers 202a, 202b, 202c, 202d positioned at opposite corners of the vehicle.

The suspension system 200 also includes four bridge hydraulic lines 240a, 240b, 240c, 240d that fluidly couple the first and third hydraulic circuits 220a, 220c and the second and fourth hydraulic circuits 220b, 220d to one another. The four bridge hydraulic lines 240a, 240b, 240c, 240d include a front left bridge hydraulic line 240a that extends between and fluidly connects the first cross-over hydraulic line 264a and the third cross-over hydraulic line 264c, a front right bridge hydraulic line 240b that extends between and fluidly connects the second cross-over hydraulic line 264b and the fourth cross-over hydraulic line 264d, a back left bridge hydraulic line 240c that extends between and fluidly connects the second cross-over hydraulic line 264b and the fourth cross-over hydraulic line 264d, and a back right bridge hydraulic line 240d that extends between and fluidly connects the first cross-over hydraulic line 264a and the third cross-over hydraulic line 264c.

The front left bridge hydraulic line 240a is connected to the first cross-over hydraulic line 264a between the compression chamber port 230b of the front left damper 202a and the first manifold hydraulic line 238a and is connected to the third cross-over hydraulic line 264c between the rebound chamber port 230a of the front left damper 202a and the third manifold hydraulic line 238c. The front right bridge hydraulic line 240b is connected to the second cross-over hydraulic line 264b between the compression chamber port 230b of the front right damper 202b and the second manifold hydraulic line 238b and is connected to the fourth cross-over hydraulic line 264d between the rebound chamber port 230a of the front right damper 202b and the fourth manifold hydraulic line 238d. The back left bridge hydraulic line 240c is connected to the second cross-over hydraulic line 264b between the rebound chamber port 230a of the back left damper 202c and the second manifold hydraulic line 238b and is connected to the fourth cross-over hydraulic line 264d between the compression chamber port 230b of the back left damper 202c and the fourth manifold hydraulic line 238d. The back right bridge hydraulic line 240d is connected to the first cross-over hydraulic line 264a between the rebound chamber port 230a of the back right damper 202d and the first manifold hydraulic line 238a and is connected to the third cross-over hydraulic line 264c between the compression chamber port 230b of the back right damper 202d and the third manifold hydraulic line 238c. In the illustrated example, the various hydraulic lines are made of flexible tubing (e.g., hydraulic hoses), but it should be appreciated that other conduit structures and/or fluid passageways can be used.

A front left accumulator 242a is arranged in fluid communication with the first cross-over hydraulic line 264a at a location between the compression chamber port 230b of the front left damper 202a and the front left bridge hydraulic line 240a. A front right accumulator 242b is arranged in fluid communication with the second cross-over hydraulic line 264b at a location between the compression chamber port 230b of the front right damper 202b and the front right bridge hydraulic line 240b. A back left accumulator 242c is arranged in fluid communication with the fourth cross-over hydraulic line 264d at a location between the compression chamber port 230b of the back left damper 202c and the back left bridge hydraulic circuit 220c. A back right accumulator 242d is arranged in fluid communication with the third cross-over hydraulic line 264c at a location between the compression chamber port 230b of the back right damper 202d and the back right bridge hydraulic line 240d. Each of the accumulators 242a, 242b, 242c, 242d have a variable fluid volume that increases and decreases depending on the fluid pressure in the first, second, third, and fourth cross-over hydraulic lines 264a, 264b, 264c, 264d. It should be appreciated that the accumulators 242a, 242b, 242c, 242d may be constructed in a number of different ways. For example and without limitation, the accumulators 242a, 242b, 242c, 242d may have accumulation chambers and pressurized gas chambers that are separated by floating pistons or flexible membranes, such as a bellows. Each of the accumulators 242a, 242b, 242c, 242d is configured as a proportional pressure accumulator. As will be described in greater detail below, each proportional pressure accumulator 242a, 242b, 242c, 242d includes a volume varying mechanism 243a, 243b, 243c, 243d operable to vary the volume of the pressurized gas chamber and thereby vary the pressure of the gas stored within the pressurized gas chamber. As the volume of the pressurized gas chamber is decreased, the pressure within the associated accumulation chamber increases.

The suspension system 200 also includes four electro-mechanical comfort valves 244a, 244b, 244c, 244d that are connected in-line (i.e., in series) with each of the bridge hydraulic lines 240a, 240b, 240c, 240d. A front left comfort valve 244a is positioned in the front left bridge hydraulic line 240a. A front right comfort valve 244b is positioned in the front right bridge hydraulic line 240b. A back left comfort valve 244c is positioned in the back left bridge hydraulic line 240c. A back right comfort valve 244d is positioned in the back right bridge hydraulic line 240d. In the illustrated example, the four comfort valves 242a, 244b, 244c, 244d and the two manifold comfort valves 260a, 260b are semi-active electro-mechanical valves with a combination of passive spring-disk elements and a solenoid. The comfort valves 244a, 244b, 244c, 244d and the two manifold comfort valves 260a, 260b are electronically connected to the controller, which is configured to supply electrical current to the solenoids of the comfort valves 244a, 244b, 244c, 244d and the two manifold comfort valves 260a, 260b to selectively and individually open and close the comfort valves 244a, 244b, 244c, 244d and the two manifold comfort valves 260a, 260b.

There are three primary types of suspension movements that the illustrated suspension system 200 can control by changing or adapting the roll and/or pitch stiffness of the vehicle: leaning to one side or the other during cornering (i.e., roll) pitching forward during braking (i.e., brake dive), and pitching aft during acceleration (i.e., rear end squat). Descriptions of how the suspension system 200 reacts to each of these conditions are provided below.

When the vehicle is put into a right-hand turn, the momentum of the sprung weight of the vehicle tends to make the vehicle lean left towards the outside of the turn, compressing the front left damper 202a and the back left damper 202c. When this occurs, fluid flows out from the first compression chamber 226a of the front left damper 202a and the third compression chamber 226c of the back left damper 202c into the first and fourth cross-over hydraulic lines 264a, 264d. As a result of the weight transfer to the left side of the vehicle, the front right damper 202b and back right damper 202d begin to extend, causing fluid to flow out of the second rebound chamber 228b of the front right damper 202b and the fourth rebound chamber 228d of the back right damper 202d into the first and fourth cross-over hydraulic lines 264a, 264d. When the comfort valves 244a, 244b, 244c, 244d are closed, the fluid flow out of the first compression chamber 226a of the front left damper 202a, out of the third compression chamber 226c of the back left damper 202c, out of the second rebound chamber 228b of the front right damper 202b, and out of the fourth rebound chamber 228d of the back right damper 202d and into the first and fourth cross-over hydraulic lines 264a, 264d increases the pressure in the front left and back left accumulators 242a, 242c, thus providing a passive roll resistance where it becomes increasingly more difficult to compress the front left damper 202a and the back left damper 202c since the first compression chamber 226a of the front left damper 202a and the third compression chamber 226c of the back left damper 202c are connected in fluid communication with the first and fourth hydraulic circuits 220a, 220d. At the same time, fluid flows out of front right and back right accumulators 242b, 242d and into the first rebound chamber 228a of the front left damper 202a, into the third rebound chamber 228c of the back left damper 202c, into the second compression chamber 226b of the front right damper 202b, and into the fourth compression chamber 226d of the back right damper 202d. The resulting pressure difference between the dampers 202a, 202b, 202c, 202d generates damper forces that counteract or resist the roll moment of the vehicle. As noted above with reference to suspension system 100, select proportional accumulators may be actuated to reduce the volume of their pressurized gas chambers and increase the pressure of the fluid in that portion of suspension system 200.

The opposite is true when the vehicle is put into a left-hand turn, where the momentum of the sprung weight of the vehicle tends to make the vehicle lean right towards the outside of the turn, compressing the front right damper 202b and the back right damper 202d. When this occurs, fluid flows out from the second compression chamber 226b of the front right damper 202b and the fourth compression chamber 226d of the back right damper 202d into the second and third cross-over hydraulic lines 264b, 264c. As a result of the weight transfer to the right side of the vehicle, the front left damper 202a and back left damper 202c begin to extend, causing fluid to flow out of the first rebound chamber 228a of the front left damper 202a and the third rebound chamber 228c of the back left damper 202c into the second and third cross-over hydraulic lines 264b, 264c. When the comfort valves 244a, 244b, 244c, 244d are closed, the fluid flow out of the second compression chamber 226b of the front right damper 202b, out of the fourth compression chamber 226d of the back right damper 202d, out of the first rebound chamber 228a of the front left damper 202a, and out of the third rebound chamber 228c of the back left damper 202c and into the second and third cross-over hydraulic lines 264b, 264c increases the pressure in the front right and back right accumulators 142b, 142d, thus providing a passive roll resistance where it becomes increasingly more difficult to compress the front right damper 202b and the back right damper 202d since the second compression chamber 226b of the front right damper 202b and the fourth compression chamber 226d of the back right damper 202d are connected in fluid communication with the second and third hydraulic circuits 220b, 220c. At the same time, fluid flows out of front left and back left accumulators 242a, 242c and into the second rebound chamber 228b of the front right damper 202b, into the fourth rebound chamber 228d of the back right damper 202d, into the first compression chamber 226a of the front left damper 202a, and into the third compression chamber 226c of the back left damper 202c. The resulting pressure difference between the dampers 202a, 202b, 202c, 202d generates damper forces that counteract or resist the roll moment of the vehicle.

During braking, the momentum of the sprung weight of the vehicle tends to make the vehicle pitch or dive forward, compressing the front left damper 202a and the front right damper 202b. When this occurs, fluid flows out from the first compression chamber 226a of the front left damper 202a into the first cross-over hydraulic line 264a and out from the second compression chamber 226b of the front right damper 202b into the second cross-over hydraulic line 264b. As a result of the weight transfer to the front of the vehicle, the back left damper 202c and back right damper 202d begin to extend, causing fluid to flow out of the third rebound chamber 228c of the back left damper 202c into the second cross-over hydraulic line 264b and out of the fourth rebound chamber 228d of the back right damper 202d into the first cross-over hydraulic line 264a. With the front left, front right, back left, and back right comfort valves 244a, 244b, 244c, 244d and the first and second manifold comfort valves 260a, 260b all closed, the fluid flow out of the third rebound chamber 228c of the back left damper 202c and the fourth rebound chamber 228d of the back right damper 202d into the first and second cross-over hydraulic lines 264a, 264b increases the pressure in the front left and front right accumulators 242a, 242b, thus providing a passive pitch resistance where it becomes increasingly more difficult to compress the front left damper 202a and the front right damper 202b since the first compression chamber 226a of the front left damper 202a and the second compression chamber 226b of the front right damper 202b are connected in fluid communication with the first and second hydraulic circuits 220a, 220b.

During acceleration, the momentum of the sprung weight of the vehicle tends to make the vehicle pitch or squat rearward (i.e., aft), compressing the back left damper 202c and the back right damper 202d. When this occurs, fluid flows out from the third compression chamber 226c of the back left damper 202c into the fourth cross-over hydraulic line 264d and out of the fourth compression chamber 226d of the back right damper 202d into the third cross-over hydraulic line 264c. As a result of the weight transfer to the back/rear of the vehicle, the front left damper 202a and front right damper 202b begin to extend, causing fluid to flow out of the first rebound chamber 228a of the front left damper 202a into the third cross-over hydraulic line 264c and out of the second rebound chamber 228b of the front right damper 202b into the fourth cross-over hydraulic line 264d.

With the front left, front right, back left, and back right comfort valves 242a, 244b, 244c, 244d and the first and second manifold comfort valves 260a, 260b all closed, the fluid flow out of the first rebound chamber 228a of the front left damper 202a and the second rebound chamber 228b of the front right damper 202b into the third and fourth cross-over hydraulic lines 264c, 264d increases the pressure in the back left and back right accumulators 242c, 242d, thus providing a passive pitch resistance where it becomes increasingly more difficult to compress the back left damper 202c and the back right damper 202d since the third compression chamber 226c of the back left damper 202c and the fourth compression chamber 226d of the back right damper 202d are connected in fluid communication with the third and fourth hydraulic circuits 220c, 220d.

When active or passive roll and/or pitch stiffness is not required, the four comfort valves 244a, 244b, 244c, 244d and the two manifold comfort valves 260a, 260b can be opened to enhance the ride comfort of the suspension system 200 and reduce or eliminate unwanted suspension movements resulting from the hydraulic coupling of one damper of the system to another damper of the system (e.g., where the compression of one damper causes movement and/or a dampening change in another damper). For example, when the front left comfort valve 244a is open and the front left damper 202a undergoes a compression stroke as the front wheel hits a bump, fluid may flow from the first compression chamber 226a of the front left damper 202a, into the first cross-over hydraulic line 264a, from the first cross-over hydraulic line 264a to the third cross-over hydraulic line 264c passing through the front left bridge hydraulic line 240a and the front left comfort valve 244a, and into the first rebound chamber 228a of the front left damper 202a. Thus, fluid can travel from the first compression chamber 226a to the first rebound chamber 228a of the front left damper 202a with the only restriction coming from the dampening valves in the rebound and compression chamber ports 230a, 230b of the front left damper 202a. As such, when all of the comfort valves 244a, 244b, 244c, 244d and the manifold comfort valves 260a, 260b are open, the dampers 202a, 202b, 202c, 202d are effectively decoupled from one another for improved ride comfort.

Figure 3:
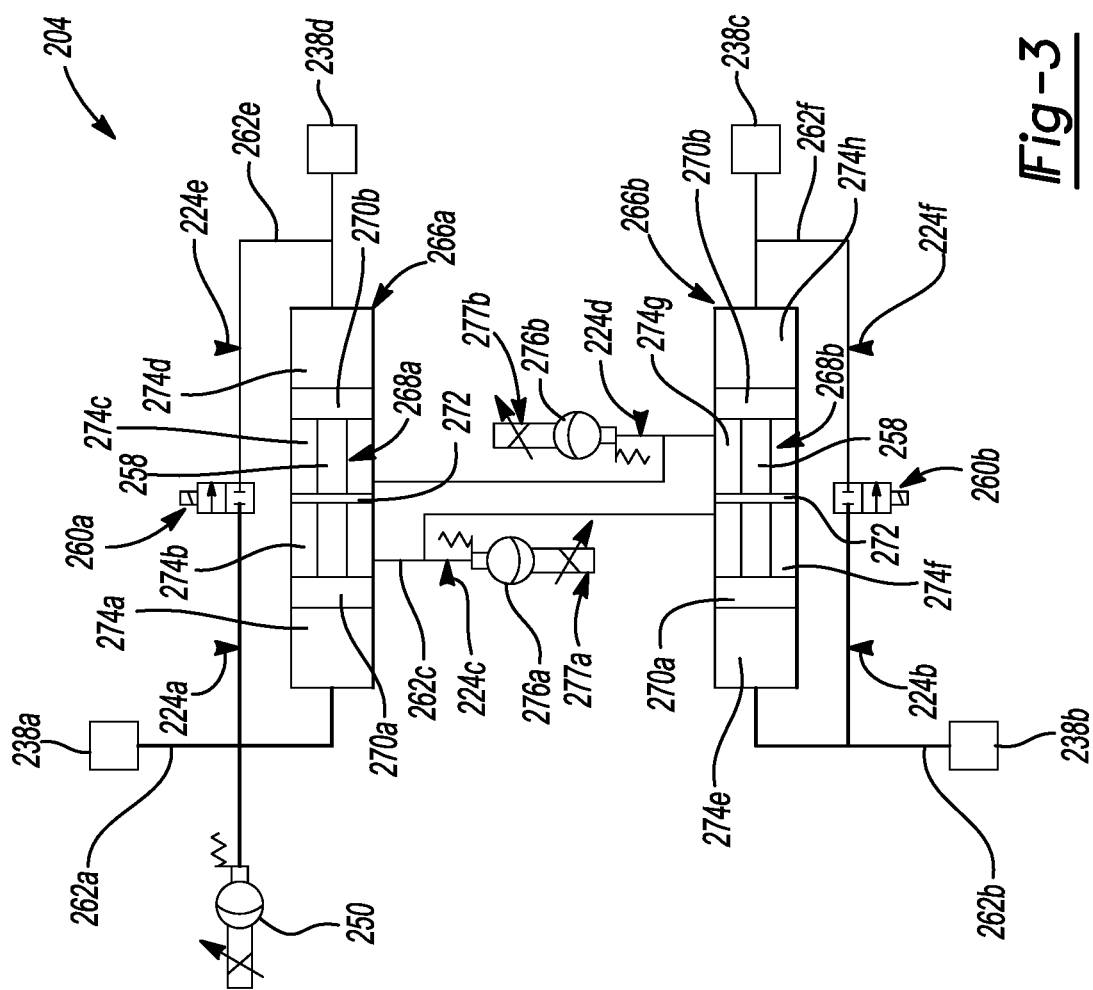
FIG. 3 is a schematic diagram illustrating an exemplary comfort valve equipped manifold assembly.

FIG. 3 illustrates the manifold assembly 204 of the suspension system 200 in more detail. The manifold assembly 204 includes first and second piston bores 266a, 266b that slidingly receive first and second floating pistons 268a, 268b, respectively. Each floating piston 268a, 268b includes a piston rod 258 and first and second piston heads 270a, 270b that are fixedly coupled to opposing ends of the piston rod 258. A chamber divider 272 is fixedly mounted at a midpoint of each of the first and second piston bores 266a, 266b. Each chamber divider 272 includes a through-bore that slidingly receives the piston rod 258. As such, the first piston bore 266a is divided by the first floating piston 268a into a first piston chamber 274a that is arranged in fluid communication with the first manifold conduit 262a, a second piston chamber 274b disposed between the first piston head 270a of the first floating piston 268a and the chamber divider 272 in the first piston bore 266a, a third piston chamber 274c disposed between the second piston head 270b of the first floating piston 268a and the chamber divider 272 in the first piston bore 266a, and a fourth piston chamber 274d that is arranged in fluid communication with the fifth manifold conduit 262e. Similarly, the second piston bore 266b is divided by the second floating piston 268b into a fifth piston chamber 274e that is arranged in fluid communication with the second manifold conduit 262b, a sixth piston chamber 274f disposed between the first piston head 270a of the second floating piston 268b and the chamber divider 272 in the second piston bore 266b, a seventh piston chamber 274g disposed between the second piston head 270b of the second floating piston 268b and the chamber divider 272 in the second piston bore 266b, and an eighth piston chamber 274h that is arranged in fluid communication with the sixth manifold conduit 262f. Optionally, biasing members (e.g., springs) (not shown) may be placed in the second, third, sixth, and seventh piston chambers 274b, 274c, 274f, 274g to naturally bias the first and second floating pistons 268a, 268b to a centered position where the second and third piston chambers 274b, 274c and the sixth and seventh piston chambers 274f, 274g have equal volumes.

The first manifold conduit 262a is arranged in fluid communication with the first manifold hydraulic line 238a, the second manifold conduit 262b is arranged in fluid communication with the second manifold hydraulic line 238b, the fifth manifold conduit 262e is arranged in fluid communication with the fourth manifold hydraulic line 238d, and the sixth manifold conduit 262f is arranged in fluid communication with the third manifold hydraulic line 238c. The third manifold conduit 262c is arranged in fluid communication with the second and sixth piston chambers 274b, 274f while the fourth manifold conduit 262d is arranged in fluid communication with the third and seventh piston chambers 274c, 274g.

As previously noted, the manifold assembly 204 includes the first manifold accumulator 276a and the second manifold accumulator 276b. The first and second manifold accumulators 276a, 276b may be constructed in a number of different ways. For example and without limitation, the first and second manifold accumulators 276a, 276b may have accumulation chambers and pressurized gas chambers that are separated by floating pistons or flexible membranes. The first and second manifold accumulators 276a, 276b are also constructed as proportional pressure accumulators having mechanisms 277a, 277b operable to vary the volume of the pressurized gas chamber and thereby vary the pressure of the fluid within the accumulation chamber.

Under braking, fluid flow within the four hydraulic circuits generates a pressure difference between the first and second manifold accumulators 276a, 276b, which in turn causes an increase in pressure in the front left and front right accumulators 242a, 242b and provides a pitch stiffness that resists the compression of the front dampers 202a, 202b and rebound/extension of the back dampers 202c, 202d. Under acceleration, fluid flow within the four hydraulic circuits generates an opposite pressure difference between the first and second manifold accumulators 276a, 276b, which in turn causes an increase in pressure in the back left and back right accumulators 242c, 242d and provides a pitch stiffness that resists the rebound/extension of the front dampers 202a, 202b and compression of the back dampers 202c, 202d.

The manifold assembly 404 may also include six pressure sensors 224a, 224b, 224c, 224d, 224e, 224f: a first pressure sensor 224a arranged to monitor fluid pressure in the first manifold conduit 262a, a second pressure sensor 224b arranged to monitor fluid pressure in the second manifold conduit 262b, a third pressure sensor 224c arranged to monitor fluid pressure in the third manifold conduit 262c, a fourth pressure sensor 224d arranged to monitor fluid pressure in the fourth manifold conduit 262d, a fifth pressure sensor 224e arranged to monitor fluid pressure in the fifth manifold conduit 262e, and a sixth pressure sensor 224f arranged to monitor fluid pressure in the sixth manifold conduit 262f. While not shown in FIG. 3, the pressure sensors 224a, 224b, 224c, 224d, 224e, 224f are all electrically connected to the controller.

As mentioned, at least one of accumulators 142a, 142b, 142c, 142d, 242a, 242b, 242c, 242d, 250, 276a and 276b may be configured as a proportional pressure accumulator. With reference to FIGS. 4 and 5, an exemplary proportional pressure bellows accumulator is identified by reference numeral 300. It should be appreciated that accumulator 300 may be positioned at any number of physical locations on the vehicle as long as fluid communication occurs between an accumulation chamber 304 of accumulator 300 and a desired hydraulic line, damper or valve of the suspension system. In one example, accumulator 300 is directly fixed to a base of a damper housing (not shown).

Accumulator 300 includes an accumulator port 302 and an accumulation chamber 304 that are arranged in fluid communication with at least one of the fluid lines, dampers, or valves previously described. Accumulation chamber 304 contains the same fluid that passes through the hydraulic lines of the suspension system. Further, accumulator 300 also includes a pressurized gas chamber 306 that is defined by and contained within a bellows assembly 308 that is positioned inside an outer shell 310 of accumulator 300. Pressurized gas chamber 306 is filled with a pressurized gas, sealed and fluidly isolated (i.e., separated) from the accumulation chamber 304. In the illustrated example, accumulation chamber 304 is positioned longitudinally between the pressurized gas chamber 306 and accumulator port 302. However, it should be appreciated that accumulator 300 could be designed with accumulation chamber 304 in an alternative location, such as between pressurized gas chamber 306 and a structural component, a damper, or another portion of outer shell 310. Bellows assembly 308 is expandable and compressible in an axial direction inside outer shell 310 of accumulator 300 such that the volume of both the accumulation chamber 304 and pressurized gas chamber 306 can increase and decrease with changes to the fluid pressure within accumulation chamber 304.

The pressurized gas inside pressurized gas chamber 306 of accumulator 300 operates to apply a positive pressure inside accumulator 300, which forces fluid out of accumulation chamber 304 when fluid pressure at accumulator port 302 is less than the gas pressure inside pressurized gas chamber 306. In other words, pressurized gas chamber 306 will increase in volume and accumulation chamber 304 will decrease in volume until the pressure equalizes between accumulation chamber 304 and pressurized gas chamber 306. Conversely, when fluid pressure at accumulator port 302 increases, fluid flows into accumulation chamber 304, causing accumulation chamber 304 to increase in volume and pressurized gas chamber 306 to decrease in volume until pressure equalizes.

Outer shell 310 of accumulator 300 is generally cylindrical in shape and extends annularly about an accumulator axis A. Outer shell 310 of accumulator 300 includes an open end 312 that abuts a crown 313 at a distal end 314 of accumulator 300. Crown 313 is sealed and fixed to outer shell 310. A cap 316 is sealed and fixed to crown 313. Cap 316 includes a flange 318 with apertures 319 extending therethrough. A gas charging port (not shown) extends through cap 316 or crown 313 in fluid communication with pressurized gas chamber 306. Cap 316 is generally arranged along a transverse plane that is substantially perpendicular to the accumulator axis A. As such, cap 316 of accumulator 300 generally closes off distal end 314 of outer shell 310.

Although other configurations are possible, outer shell 310 of accumulator 300 may be made of metal and includes an integral end wall 320 formed as one-piece with outer shell 310. End wall 320 extends generally transversely relative to accumulator axis A. A nipple 322 axially extends from end wall 320 and includes accumulator port 302. Nipple 322 may be externally threaded to provide a mounting provision for accumulator 300. Apertures 319 may be used as drive sockets for a tool (not shown) to fix nipple 322 to any suitable structure. Other geometrical features may be provided in lieu of or in addition to apertures 319 to apply a torque to outer shell 310 and nipple 322 such as a hexagon shape on flange 318 and milled slots or flats on outer shell 310. It is also contemplated that alternate mounting arrangements such as threaded apertures or axially extending studs may be provided on outer shell 310 such as at end wall 320.

Bellows assembly 308 of accumulator 300 is arranged in a sliding/slip fit inside outer shell 310 and has an annular bellows wall 324, which extends coaxially about the accumulator axis A and axially between cap 316 and a plate 326 of the bellows assembly 308. Plate 326 of bellows assembly 308 has a disc shape and an outer diameter that is fixed to annular bellows wall 324. A centering ring 327 may be used to align annular bellows wall 324 within outer shell 310 along accumulator axis A. Centering ring 327 minimizes the likelihood that bellows assembly 308 will contact inside surface 338 of outer shell 310. Cap 316 includes an annular flange 328 that is fixed to annular bellows wall 324 at distal end 314. Together, annular bellows wall 324, cap 316 and plate 326 of bellows assembly 308 cooperate to define pressurized gas chamber 306 within accumulator 300. Annular bellows wall 324 has a corrugated shape, which allows bellows assembly 308 to expand and contract in length (i.e., the distance between cap 316 and plate 326 of bellows assembly 308 can increase or decrease) depending on the pressure differential between the accumulation chamber 304 and the pressurized gas chamber 306.

As best shown in FIGS. 4 and 5, the proportional pressure accumulator 300 includes a volume varying mechanism 330 fixed to the cap 316. The volume varying mechanism 330 is operable to vary the volume of the pressurized gas chamber 306. In the arrangement shown in the figures, the volume varying mechanism 330 includes an electrically powered linear actuator 332.

Electrically powered linear actuator 332 includes a housing 334 coupled to cap 318. The housing 334 includes a cavity 336 in receipt of an electromagnet 338. The housing 334 and the cap 318 retain the electromagnet 338 in a fixed position relative to the housing 334. The housing 334 also includes a bore 342 in communication with the cavity 336. The linear actuator 332 includes a ram 344 that is axially movable between a retracted position depicted in FIG. 4 and an extended position depicted in FIG. 5. A bushing or bearing 346 guides the ram 344 for axial translation within the cavity 336 and the bore 342.

It should be appreciated that bore 342 is in communication with the gas stored inside the pressurized gas chamber 306 via a port 352 extending through housing 334. It may be desirable to maintain electromagnet 338 in an environment that is not in physical communication with the gas stored within pressurized gas chamber 306. As such, an optional seal 350 may engage the ram 344 to maintain separation between cavity 336 and bore 342.

The ram 344 includes an end face 356 in contact with the fluid positioned within the bore 342. An optional spring 358 may be positioned within the housing 334 in engagement with a land 362. The spring 358 applies a force to end face 356 urging the ram 344 toward its retracted position depicted in FIG. 4. It should be appreciated that the spring 358 is optional because the pressure of the fluid within the accumulation chamber 304 will urge the ram 344 toward the retracted position. A retainer 364 may slidingly support an end of the ram 344 opposite the end having end face 356 via a connection to 318 or housing 334.

It is contemplated that ram 344 will typically be positioned at or near the retracted position depicted in FIG. 4 when electromagnet 338 is deenergized. The electromagnet 338 is connected to and controlled by the controller. Once electromagnet 338 is energized, the electromagnet imparts a force on ram 344 urging the ram 344 toward the extended position depicted in FIG. 5. Varying the volume of the pressurized gas chamber 306 causes pressure within the pressurized gas chamber 306 to change proportionally.

As previously described, the pressure within the pressurized gas chamber 306 is applied to the fluid within accumulation chamber 304 via bellows assembly 308. The magnitude of electrical energy applied to the electromagnet 338 defines the force applied to the ram 344. The physical characteristics of the ram 344, including the area of the end face 356 and the length of the ram 344 translated, defines a change in volume within pressurized gas chamber 306. An exemplary change in volume is depicted when comparing FIGS. 4 and 5. It should be appreciated that the application or removal of electrical energy to electromagnet 338 varies the gas pressure inside pressurized gas chamber 306. If the hydraulic system to which accumulator 300 is attached is closed, the pressure of fluid within accumulation chamber 304 will also change to obtain a balance between pressurized gas chamber 306 and accumulation chamber 304. If the fluid system to which accumulator 300 is attached is not closed, the accumulator may act as a pump displacing fluid from accumulation chamber 304 through the accumulator port 302 to other components within the suspension system. Once the plate 326 of the bellows assembly 308 engages the end wall 320 of outer shell 310, a further reduction in volume of the pressurized gas chamber 306 will not directly apply additional pressure to the fluid within accumulation chamber 304 but will increase the pressure required to collapse bellows assembly 308 from its fully extended position shown in FIG. 5. to a position where the plate 326 is spaced apart from the end wall 320.

While a bellows accumulator equipped with a volume displacement mechanism including an electromagnet may be used, a variety of other pressure and volume changing devices are contemplated. In particular, any one or more of the accumulators 142a, 142b, 142c, 142d, 242a, 242b, 242c, 242d, 250, 276a and 276b may be configured with alternate structures. By way of example and to avoid redundancy, proportional pressure accumulator 142a depicted in FIG. 1 will be described. The accumulator 142a includes a housing 145a defining a pressurized gas chamber 146a and an accumulator chamber 147a. The volume displacement mechanism 143a includes a linear actuator 148a acting on the pressurized gas chamber 146a to vary its volume.

The linear actuator 148a may be equipped with an electrical stepper motor 149a having an output drivingly coupled to an input member of a drive mechanism. Rotation of the stepper motor output causes rotation of the input member of the drive mechanism. This rotation is in turn converted to linear movement of an output member of the drive mechanism. The linearly moveable output member acts as or is coupled to the ram to vary the volume of the pressurized gas chamber 146a. Any number of gear multiplication devices may be incorporated as necessary to obtain the desired magnitude of force applied to the ram. The gear mechanism may be configured as an overdrive or gear reduction arrangement such that relatively large displacements of the ram may be accomplished with relatively low input energy.

Furthermore, the foregoing discussion discloses and describes merely exemplary embodiments of the present disclosure. One skilled in the art will readily recognize from such discussion, and from the accompanying drawings and claims, that various changes, modifications and variations may be made therein without departing from the spirit and scope of the disclosure as defined in the following claims.

What is claimed is:

1. A suspension system, comprising:
    a first damper including a first compression chamber and a first rebound chamber;
    a second damper including a second compression chamber and a second rebound chamber;
    a first hydraulic circuit including a first hydraulic line that extends between and fluidly connects the first rebound chamber of the first damper and the second compression chamber of the second damper;
    a second hydraulic circuit including a second hydraulic line that extends between and fluidly connects the first compression chamber of the first damper and the second rebound chamber of the second damper; and
    a proportional pressure accumulator including an accumulation chamber, a pressurized gas chamber and a volume varying mechanism, the accumulation chamber being in fluid communication with at least one of the first hydraulic circuit and the second hydraulic circuit, the pressurized gas chamber applying a pressure to the accumulation chamber, and the volume varying mechanism being operable to vary a volume of the pressurized gas chamber to vary a pressure within the pressurized gas chamber and change a fluid pressure within the at least one of the first hydraulic circuit and the second hydraulic circuit.

2. The suspension system of claim 1, wherein the proportional pressure accumulator includes a bellows defining the pressurized gas chamber, the bellows being expandable and positioned with a housing.

3. The suspension system of claim 2, wherein the bellows is positioned adjacent the accumulation chamber and the volume varying mechanism is at least partially positioned with the pressurized gas chamber.

4. The suspension system of claim 1, wherein the volume varying mechanism includes a selectively moveable ram, wherein the volume of the pressurized gas chamber is changed based on a changed position of the ram.

5. The suspension system of claim 4, wherein the volume varying mechanism includes a linear actuator coupled to the ram.

6. The suspension system of claim 5, wherein the linear actuator includes an electromagnet, wherein energization of the electromagnet induces a force on the ram to move.

7. The suspension system of claim 6, wherein the volume varying mechanism includes a housing having a cavity containing the electromagnet and a bore in receipt of at least a portion of the ram, the volume varying mechanism further including a seal separating the cavity from the bore.

8. The suspension system of claim 4, further including a spring urging the ram toward a retracted position.

9. The suspension system of claim 1, wherein the volume varying mechanism is electrically controllable to selectively vary the volume of the pressurized gas chamber.

10. The suspension system of claim 1, wherein the volume varying mechanism includes a linear actuator with an electric stepper motor to selectively vary the volume of the pressurized gas chamber.

11. A suspension system, comprising:
    a front left damper including a first compression chamber and a first rebound chamber;
    a front right damper including a second compression chamber and a second rebound chamber;
    a back left damper including a third compression chamber and a third rebound chamber;

a back right damper including a fourth compression chamber and a fourth rebound chamber;

a first hydraulic circuit including a front hydraulic line, a rear hydraulic line, and a first longitudinal hydraulic line that extends between and fluidly connects said front and rear hydraulic lines of said first hydraulic circuit;

said front hydraulic line of said first hydraulic circuit extending between and fluidly connecting said first longitudinal hydraulic line and said second rebound chamber of said front right damper;

said rear hydraulic line of said first hydraulic circuit extending between and fluidly connecting said first longitudinal hydraulic line and said fourth rebound chamber of said back right damper;

said first longitudinal hydraulic line extending between and fluidly connecting said first compression chamber of said front left damper and said third compression chamber of said back left damper;

a second hydraulic circuit including a front hydraulic line, a rear hydraulic line, and a second longitudinal hydraulic line that extends between and fluidly connects said front and rear hydraulic lines of said second hydraulic circuit;

said front hydraulic line of said second hydraulic circuit extending between and fluidly connecting said second longitudinal hydraulic line and said first rebound chamber of said front left damper;

said rear hydraulic line of said second hydraulic circuit extending between and fluidly connecting said second longitudinal hydraulic line and said third rebound chamber of said back left damper;

said second longitudinal hydraulic line extending between and fluidly connecting said second compression chamber of said front right damper and said fourth compression chamber of said back right damper; and a proportional pressure accumulator including an accumulation chamber, a pressurized gas chamber and a volume varying mechanism, said accumulation chamber being in fluid communication with at least one of said first hydraulic circuit and said second hydraulic circuit, said pressurized gas chamber applying a pressure to said accumulation chamber, and said volume varying mechanism being operable to vary a volume of said pressurized gas chamber to vary the pressure within said pressurized gas chamber and change a fluid pressure within the at least one of the first hydraulic circuit and the second hydraulic circuit.

12. The suspension system of claim 11, wherein the proportional pressure accumulator includes a bellows defining the pressurized gas chamber, the bellows being expandable and positioned with a housing.

13. The suspension system of claim 12, wherein the bellows is positioned adjacent the accumulation chamber and the volume varying mechanism is at least partially positioned with the pressurized gas chamber.

14. The suspension system of claim 11, wherein the volume varying mechanism includes a selectively moveable ram, wherein the volume of the pressurized gas chamber is changed based on a changed position of the ram.

15. The suspension system of claim 14, wherein the volume varying mechanism includes a linear actuator coupled to the ram.

16. The suspension system of claim 15, wherein the linear actuator includes an electromagnet, wherein energization of the electromagnet induces a force on the ram.

17. The suspension system of claim 16, wherein the volume varying mechanism includes a housing having a cavity containing the electromagnet and a bore in receipt of at least a portion of the ram, the volume varying mechanism further including a seal separating the cavity from the bore.

18. The suspension system of claim 14, further including a spring urging the ram toward a retracted position.

19. The suspension system of claim 11, wherein the volume varying mechanism is electrically controllable to selectively vary the volume of the pressurized gas chamber and vary the pressure of the fluid within the accumulation chamber.

20. The suspension system of claim 11, wherein the volume varying mechanism includes a linear actuator with an electric stepper motor to selectively vary the volume of the pressurized gas chamber.

\* \* \* \* \*